United States Patent [19]
Edgington

[11] Patent Number: 6,037,014
[45] Date of Patent: Mar. 14, 2000

[54] COATING COMPOSITION

[75] Inventor: Garry J. Edgington, Avon Lake, Ohio

[73] Assignee: The Edgington Co., Cleveland, Ohio

[21] Appl. No.: 09/186,591

[22] Filed: Nov. 5, 1998

Related U.S. Application Data

[60] Provisional application No. 60/063,984, Nov. 6, 1997.

[51] Int. Cl.$^7$ ..................................................... B05D 3/02
[52] U.S. Cl. ........................ 427/544; 427/557; 427/591; 427/388.1
[58] Field of Search ................................. 427/388.1, 543, 427/544, 557, 591

[56] References Cited

U.S. PATENT DOCUMENTS

| | | | |
|---|---|---|---|
| 2,331,265 | 10/1943 | Coleman et al. | 260/613 |
| 2,471,959 | 5/1949 | Hunt | 260/89.5 |
| 2,484,487 | 10/1949 | Caldwell | 260/486 |
| 2,492,763 | 12/1949 | Pinkney . | |
| 2,819,296 | 1/1958 | Carnes | 260/586 |
| 2,843,568 | 7/1958 | Benning et al. | 260/77.5 |
| 2,917,538 | 12/1959 | Carlyle | 260/486 |
| 2,929,835 | 3/1960 | Hayes et al. | 260/486 |
| 2,950,313 | 8/1960 | Kirkpatrick | 260/484 |
| 3,041,371 | 6/1962 | Goldsmith et al. | 260/486 |
| 3,046,303 | 7/1962 | Cruickshank | 260/486 |
| 3,164,565 | 1/1965 | Calamari, Jr. | 260/47 |
| 3,238,133 | 3/1966 | Lorensen | 252/56 |
| 3,293,283 | 12/1966 | Dobson et al. | 260/486 |
| 3,380,831 | 4/1968 | Cohen et al. . | |
| 3,425,988 | 2/1969 | Gorman et al. | 260/47 |
| 3,445,525 | 5/1969 | Bormann et al. | 260/615 |
| 3,751,399 | 8/1973 | Lee, Jr. et al. | 260/47 |
| 3,766,132 | 10/1973 | Lee, Jr. et al. | 260/41 |
| 3,803,246 | 4/1974 | Rosenzweig et al. | 260/613 |
| 3,829,505 | 8/1974 | Herold | 260/611 |
| 3,887,609 | 6/1975 | Strehike et al. | 26/486 |
| 4,053,504 | 10/1977 | Rosenkranz et al. | 560/4 |
| 4,059,721 | 11/1977 | Rosenkranz et al. | 560/205 |
| 4,188,472 | 2/1980 | Chang . | |
| 4,223,160 | 9/1980 | Hess | 560/209 |
| 4,282,387 | 8/1981 | Olstowski et al. | 568/618 |
| 4,328,325 | 5/1982 | Marquardt et al. . | |
| 4,340,497 | 7/1982 | Knopf . | |
| 4,360,693 | 11/1982 | Orlowski | 560/220 |
| 4,365,081 | 12/1982 | Shimizu et al. | 560/209 |
| 4,368,320 | 1/1983 | Aldinger et al. . | |
| 4,382,135 | 5/1983 | Sinka et al. | 526/301 |
| 4,404,395 | 9/1983 | Markiewitz | 560/209 |
| 4,409,376 | 10/1983 | Dowbenko et al. . | |
| 4,414,278 | 11/1983 | Cohen et al. . | |
| 4,515,926 | 5/1985 | Holubka . | |
| 4,556,693 | 12/1985 | Corcoran et al. . | |
| 4,616,071 | 10/1986 | Holubka . | |
| 4,634,738 | 1/1987 | Santer . | |
| 4,677,179 | 6/1987 | Hannemann | 528/45 |
| 4,742,147 | 5/1988 | Nichols . | |
| 4,751,267 | 6/1988 | Berghoff . | |
| 4,755,581 | 7/1988 | Blackburn et al. . | |
| 4,755,582 | 7/1988 | Blackburn et al. . | |
| 4,767,883 | 8/1988 | Molaire | 560/220 |
| 4,774,356 | 9/1988 | Inoue et al. | 560/224 |
| 4,868,329 | 9/1989 | Powanda et al. | 560/205 |
| 4,876,384 | 10/1989 | Higbie et al. . | |
| 4,910,329 | 3/1990 | McDade | 560/209 |
| 4,916,254 | 4/1990 | Watanabe et al. | 560/185 |
| 4,916,255 | 4/1990 | Kobayashi et al. | 560/217 |
| 4,927,868 | 5/1990 | Schimmel et al. . | |
| 5,001,102 | 3/1991 | Wells | 502/213 |
| 5,004,828 | 4/1991 | Mathai . | |
| 5,010,187 | 4/1991 | Heuvelsland | 536/120 |
| 5,039,740 | 8/1991 | Anderson et al. | 525/7.1 |
| 5,053,554 | 10/1991 | Higbie et al. | 568/622 |

(List continued on next page.)

FOREIGN PATENT DOCUMENTS

| | | |
|---|---|---|
| 0 234 641 A1 | 9/1987 | European Pat. Off. . |
| 0360579 | 3/1990 | European Pat. Off. . |
| 0507633 | 10/1992 | European Pat. Off. . |
| 59-221360 | 12/1984 | Japan . |
| 8-283521 | 10/1996 | Japan . |
| WO 84/00771 | 3/1984 | WIPO . |
| WO 93/00380 | 1/1993 | WIPO . |
| WO 95/09890 | 4/1995 | WIPO . |
| WO 95/18173 | 7/1995 | WIPO . |
| WO 97/00281 | 1/1997 | WIPO . |

OTHER PUBLICATIONS

International Search Report for Application No. PCT/US98/23618; Mailed on Mar. 22, 1999.

Sartomer Product Catalog Monomers ■ Oligomers ■ Photoinitiators ©1997.

Modern Paint and Coatings Using VOC–Exempt Solvents to Formulate Compliant Coatings The Solvents Council, Chemical Manufacturers Association, Arlington, VA Apr. 1996.

Federation of Societies for Coatings Technology, Journal of Coatings Technology Liquid, Sprayable, "Zero" VOC Coatings Utilizing Cycloaliphatic Epoxies by R. F. Eaton and K.T. Lamb—Union Carbide Corp. vol. 68, No. 860, Sep. 1996.

Solutia—Coatings Performance Materials—Global Solutions Technical Paper Aliphatic Crosslinkers Provide Low–Temperature–Cure Coatings by Ojunga–Andrew, Monsanto Company 1990.

Solutia—Coatings Performance Materials—Global solutions Technical Paper Polyallyl Glycidyl Ether Resins for Very Fast Curing High Performance Coatings by Jerome W. Knapczyk, Solutia Inc. 1987.

*Primary Examiner*—Erma Cameron
*Attorney, Agent, or Firm*—Renner, Otto, Boisselle & Sklar, P.L.L.

[57] ABSTRACT

This invention relates to a liquid coating composition that is thermally-curable in the presence of oxygen, comprising: a monomer or oligomer containing two or more acrylate and/or methacrylate functional groups; an azo initiator; and oxygen. This invention also relates to a process for coating a substrate comprising the steps of applying a thin film of the foregoing coating composition to said substrate; and heating said coating composition at an effective temperature for an effective period of time to cure said coating composition, said applying and heating steps being conducted in the presence of oxygen.

20 Claims, No Drawings

U.S. PATENT DOCUMENTS

| | | |
|---|---|---|
| 5,073,611 | 12/1991 | Rehmer et al. . |
| 5,175,227 | 12/1992 | Gardon et al. . |
| 5,179,183 | 1/1993 | Koelske et al. . |
| 5,215,783 | 6/1993 | Harper . |
| 5,243,011 | 9/1993 | Panandiker et al. . |
| 5,322,960 | 6/1994 | Sakamoto et al. ............ 560/205 |
| 5,331,050 | 7/1994 | Harper . |
| 5,342,891 | 8/1994 | Koleske et al. . |
| 5,386,052 | 1/1995 | Sakakura ............ 560/205 |
| 5,416,136 | 5/1995 | Konzmann et al. . |
| 5,418,304 | 5/1995 | Mueller et al. . |
| 5,453,451 | 9/1995 | Sokol . |
| 5,498,751 | 3/1996 | Trapasso et al. . |
| 5,504,243 | 4/1996 | Sakamoto et al. ............ 560/205 |
| 5,508,340 | 4/1996 | Hart . |
| 5,516,820 | 5/1996 | Babjak et al. . |
| 5,554,785 | 9/1996 | Trapasso et al. . |
| 5,556,921 | 9/1996 | Dirlikov et al. . |
| 5,565,243 | 10/1996 | Mauer et al. . |
| 5,567,838 | 10/1996 | Pugach et al. ............ 560/60 |
| 5,578,675 | 11/1996 | Mormile et al. . |
| 5,587,428 | 12/1996 | Jones et al. . |
| 5,593,785 | 1/1997 | Mayo et al. . |
| 5,606,103 | 2/1997 | Trapasso et al. . |
| 5,608,012 | 3/1997 | Epple et al. . |
| 5,656,707 | 8/1997 | Kempe et al. . |
| 5,670,561 | 9/1997 | Scheibelhoffer et al. . |
| 5,670,599 | 9/1997 | Bassner . |
| 5,821,383 | 10/1998 | Haussling et al. ............ 560/205 |
| 5,856,562 | 1/1999 | Mine et al. ............ 560/205 |
| 5,877,344 | 3/1999 | Gande et al. ............ 560/205 |
| 5,888,356 | 3/1999 | Keil et al. ............ 203/8 |

COATING COMPOSITION

This application claims the benefit of U.S. Provisional Application No. 60/063984, filed Nov. 6, 1997.

TECHNICAL FIELD

This invention relates to coating compositions. More particularly, this invention relates to liquid coating compositions that are thermally curable in the presence of oxygen and are comprised of a multifunctional (meth)acrylate monomer or oligomer, an azo initiator and oxygen.

BACKGROUND OF THE INVENTION

The coatings industry is constantly searching for new technologies that to will reduce or eliminate the amount of volatile organic compounds (VOCs) in industrial paints and coatings. High solids solvent borne coatings, water based coatings, powder coatings and radiation cured (ultraviolet and electron beam) coatings are technologies that significantly reduce the amount of VOCs relative to traditional solvent borne coatings. Each of the aforementioned technologies has limitations. Thermally cured solvent borne coatings still dominate the industry because suitable substitutes for many coatings have not been found.

With the exception of ultraviolet and electron beam cured coatings and coatings comprising polyallyl glycidyl ethers, (meth)acrylate functional resins and coatings are not used in industrial coating applications. A primary reason for this is that atmospheric oxygen inhibits the curing process. Oxygen inhibited coatings cure at a low rate, often remain tacky, and exhibit poor tensile strength and durability, resulting in film properties that are unsuitable for industrial paints and coatings.

Ultraviolet curing of acrylate films in air is practical because the high density of initiating radicals generated during irradiation consumes dissolved oxygen faster than oxygen can diffuse back into the film. During irradiation, polymerization proceeds in a quasi-anaerobic environment.

Attempts to derive the benefits of free radical chemistry by thermally curing thin, high solids acrylate coatings similar to those used in ultraviolet and 30 electron beam cured coatings have produced under-cured films with marginal solvent resistance. This is true even under practical anaerobic conditions. In practice, the total exclusion of oxygen is difficult in commercial coating operations.

Polyallyl glycidyl ether resins have been used in two-component, high-solids, thermally cured coatings that comprise (meth)acrylate monomers and oligomers. These coatings are two component systems with limited pot life and are expensive due to the high cost of the polyallyl glycidyl ether component. Additionally, they require oxygen and drier compounds such as cobalt carboxylates, and require solvent for spray application. Polyallyl glycidyl ether resins have been commercially available since the early 1990's, but have only achieved very limited use in industrial paints and coatings due to their limitations.

The present invention provides a replacement for many traditional thermally cured solvent borne coatings. In one embodiment of this invention, a solventless coating is provided that can be applied via traditional/existing spray application equipment, and cured in traditional existing cure ovens at traditional cure temperatures and bake times. This embodiment can be characterized as a one-component, storage-stable, solventless, thermally curable, (meth) acrylate functional, clear or highly pigmented paint or coating with a VOC content lower than solvent or water borne coatings and equal to or less than powder coatings. These (meth)acrylate functional coatings can be cured in the presence of atmospheric oxygen. This embodiment is cost competitive with traditional general industrial coatings and is expected to result in a significant reduction in VOC emmisions introduced into the atmosphere.

SUMMARY OF THE INVENTION

This invention relates to a liquid coating composition that is thermally-curable in the presence of oxygen, comprising: a monomer or oligomer containing two or more acrylate and/or methacrylate functional groups; an azo initiator; and oxygen. This invention also relates to a process for coating a substrate comprising the steps of applying a thin film of the foregoing coating composition to said substrate; and heating said coating composition at an effective temperature for an effective period of time to cure said coating composition, said applying and heating steps being conducted in the presence of oxygen.

DESCRIPTION OF THE PREFERRED EMBODIMENT

The monomers or oligomers containing two or more acrylate and/or methacrylate functional groups that are useful with this invention can be any such monomers or oligomers known in the art. These are sometimes referred to as multifunctional (meth)acrylate monomers or oligomers. These multifunctional (meth)acrylate monomers or oligomers include difunctional, trifunctional, tetrafunctional, pentafunctional and hexafunctional monomers and oligomers. The difunctional and trifunctional monomers and oligomers are especially useful. These monomers and oligomers may include other functional groups other than the acrylate and/or methacrylate functional groups. These other functional groups include epoxy, hydroxyl, carboxyl, sulfonic, phosphonic, isocyanate, vinyl, allyl, halide (e.g., fluoride, iodide, bromide), amine, sulfonamide, carbamide, carbodiimide, cyano, acetylenic, aldehyde, peroxy, hydroperoxy, azo, peroxyester, and combinations of two or more of the foregoing. The monomers and oligomers that are useful typically have molecular weights in the range of about 200 to about 5000, and in one embodiment about 200 to about 3000, and in one embodiment about 300 to about 1000.

In one embodiment, the multifunctional (meth)acrylate monomer or oligomer is a compound represented by the formula

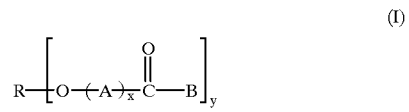

(I)

wherein in formula (I):

R is a hydrocarbon group, a siloxane group, a partially fluorinated hydrocarbon group or a perfluorocarbon group;

each A is independently a divalent group derived from an epoxide, a mixture of diol and dicarboxylic acid, a lactone, a lactam, an amino acid, a hydroxy acid or lactide;

each B is independently hydrogen, a hydrocarbon group, a siloxane group, a partially fluorinated hydrocarbon group or a perfluorocarbon group, or a group represented by the formula

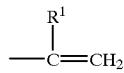     (II)

wherein in formula (II) $R^1$ is hydrogen, a hydrocarbon group, a siloxane group, a partially fluorinated hydrocarbon group, or a perfluorocarbon group;

x is a number in the range from zero to about 50, and in one embodiment about zero to about 15; and y is a number in the range from 2 to about 10, and in one embodiment 2 to about 6.

R in formula (I) a hydrocarbon group, a siloxane group, a partially fluorinated hydrocarbon group or a perfluorocarbon group containing up to about 50 carbon atoms, and in one embodiment about 5 to about 20 carbon atoms. R can be a straight chain or branched chain hydrocarbon group. The group R may also contain one or more oxygen, nitrogen, sulfur and/or halide atoms (e.g., fluoride, bromide, iodide). The group R can contain one or more hydroxyl, carboxyl and/or amine groups.

The group A in formula (I) contains 1 to about 25 carbon atoms, and in one embodiment about 2 to about 12 carbon atoms. The epoxides which A is derived from include ethylene oxide, propylene oxide, glycidyl methacrylate, and the like. The diols from which A is derived include ethylene glycol, diethylene glycol, triethylene glycol, propylene glycol, dipropylene glycol, neopentyl glycol, 1,2-, 1,3- and 1,4-butanediols, hexane diol, caprolactone diol, caprolactone triol, and the like. The dicarboxylic acids include succinic acid, glutaric acid, adipic acid, pimelic acid, suberic acid, azelaic acid, and the like. The lactones include propiolactone, butyrolactone, valerolactone, caprolactone, and the like. The lactams include propiolactam, butyrolactam, valerolactam, caprolactam, and the like. The amino acids include 3-amino propionic acid, 4-amino butyric acid, 5-amino valeric acid, 6-amino caproic acid, 7-amino heptanoic acid, 8-amino octanic acid, and the like. The hydroxy acids include lactic acid, 4-hydroxy butyric acid, 5-hydroxy valeric acid, 6-hydroxy caproic acid, 7-hydroxy heptanoic acid, 8-hydroxy octanoic acid, and the like. Mixtures of the foregoing may be used.

The hydrocarbon groups B independently are straight chain or branched chain groups of 1 to about 50 carbon atoms, and in one embodiment about 1 to about 1 6 carbon atoms.

The partially fluorinated or perfluorocarbon groups B independently are straight chain, branched chain or cyclic groups. These groups typically contain 1 to about 50 carbon atoms, and in one embodiment about 1 to about 16 carbon atoms. These partially fluorinated or perfluorocarbon groups typically contain about 3 to about 33 fluorine atoms, and in one embodiment about 3 to about 15 fluorine atoms.

The group $R^1$ in formula (II) can be hydrogen, a hydrocarbon group, a siloxane group, a partially fluorinated hydrocarbon group or a perfluorocarbon group of up to about 20 carbon atoms, and in one embodiment about 1 or about 2 carbon atoms. $R^1$ can be a partially fluorinated or perfluorocarbon hydrocarbon group which can be a straight chain or branched chain group containing 1 to about 20 carbon atoms, and in one embodiment about 2 to about 8 carbon atoms, and about 3 to about 33 fluorine atoms, and in one embodiment about 3 to about 15 fluorine atoms.

Examples of the difunctional monomers and oligomers that are useful include triethylene glycol dimethacrylate, ethylene glycol diacrylate, ethylene glycol dimethacrylate, tetraethylene glycol dimethacrylate, polyethylene glycol dimethacrylate, 1,3 butylene glycol diacrylate, 1,4-butanediol diacrylate, 1,4-butanediol dimethacrylate, diethylene glycol diacrylate, diethylene glycol dimethacrylate, 1,6 hexanediol diacrylate, 1,6 hexanediol dimethacrylate, neopentyl glycol diacrylate, neopentyl glycol dimethacrylate, tetraethylene glycol diacrylate, triethylene glycol diacrylate, 1,3 butylene glycol dimethacrylate, tripropylene glycol diacrylate, tripropylene glycol dimethacrylate, polyethylene glycol diacrylate, cyclohexane dimethanol dimethacrylate, cyclohexane dimethanol diacrylate, ethoxylated bisphenol A diacrylate, ethoxylated bisphenol A dimethacrylate, propoxylated neopentyl glycol diacrylate, propoxylated neopentyl glycol dimethacrylate, alkoxylated aliphatic diacrylates, alkoxylated aliphatic dimethacrylates, and the like.

Examples of the trifunctional monomers and oligomers that are useful include trimethylolpropane trimethacrylate, trimethylolpropane triacylate, tris (2-hydroxy ethyl) isocyanurate triacrylate, ethoxylated trimethylolpropane triacrylate, pentaerythritol triacylate, propoxylated trimethylolpropane triacrylate, propoxylate trimethylolpropane trimethacrylate, propoxylated glyceryl triacrylate, tris (2-hydroxy ethyl) isocyanurate trimethacrylate, ethoxylated trimethylolpropane trimethacrylate, pentaerythritol trimethacrylate, propoxylated glyceryl trimethacrylate, and the like. Propoxylated trimethylolpropane tri(meth)acrylate is especially useful.

Examples of the tetrafunctional, pentafunctional and hexafunctional monomers and oligomers that are useful include pentaerythritol tetraacrylate, di-trimethylolopropane tetraacrylate, dipentaerythritol pentaacrylate, ethoxylated pentaerythritol tetraacrylate, pentaacrylate ester, pentaerythritol hexaacrylate, pentaerythritol tetramethacrylate, ditrimethyloloropane tetramethacrylate, dipentaerythritol pentamethacrylate, ethoxylated pentaerythritol teteramethacrylate, pentaerythritol hexamethacrylate, and the like.

Mixtures of two of more of any of the foregoing multifunctional (meth)acrylate monomers or oligomers can also be used.

Examples of commercially available multifunctional (meth)acrylate monomers and oligomers that can be used include SR 492 (a product of Sartomer Company under the trade designation SR 492 (propoxylated$_3$ trimethylol propane triacrylate) and SR-501 (propoxylated$_6$ trimethylol propane triacrylate). The term "propoxylated$_3$" refers to the fact that there are three propoxy groups, i.e., $(C_3H_6O)_3$, in SR 492. Similarly, the term "propoxylated$_6$" refers to the fact that there are six propoxy groups, i.e., $(C_3H_6O)_6$, in SR-501. Thus, SR 492 may be represented by the formula

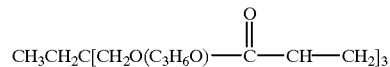

Similarly, SR 501 may be represented by the formula

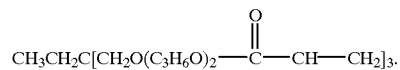

In one embodiment, the multifunctional (meth)acrylate monomer or oligomer is a urethane-containing multifunctional (meth)acrylate monomer or oligomer. These can be prepared by reacting a hydroxy-containing monofunctional (meth)acrylate monomer or oligomer with a multifunctional isocyante, optionally in the presence of a catalyst. The hydroxy-containing monofunctional (meth)acrylate monomers or oligomers that can be used include those represented by the formula

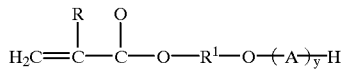

(III)

wherein in formula (III): R is hydrogen or methyl; $R^1$ is a hydrocarbon group of 1 to about 12 carbon atoms, and in one embodiment about 2 or about 3 carbon atoms; each A is independently a divalent group derived from an epoxide, a mixture of diol and dicarboxylic acid, a lactone, a lactam, an amino acid, a hydroxy acid or lactide; and y is a number in the range of zero to about 20. The divalent groups A can be derived from the same compounds discussed above with respect to formula (I). Examples of the hydroxy-containing monofunctional (meth)acrylate monomers or oligomers that can be used include hydroxy propyl acrylate, hydroxy propyl methacrylate, hydroxyethyl acrylate, hydroxy ethyl methacrylate, caprolated hydroxy ethyl (meth) acrylate, caprolated hydroy propyl (meth) acrylate, and the like. The isocyantes that can be used include polymeric isocyanates, modified isocyanates, isocyanate prepolymers, biurets, uretidiones and isocyanurates. Examples of useful isocyanates include isophorone diisocyante, hexamethylene diisocyanate, 4,4'-methylene bis(cyclohexyl isocyanate), bis (4-isocyanatocyclohexyl) methane, 2,4-toluene diisocyanate, 2,6-toluene diisocyanate, 4,4'-diphenylmethane diisocyanate, tetramethyl-1,3-xylene diisocyanate, and the like. The equivalent ratio of hydroxy funtional (meth)acrylate monomer or oligomer to isocyanate is generally from about 0.1 to about 1.1 and in one embodiment about 0.98 to about 1.02. The catalysts that can be used include organo tin catalysts, such as dibutyl tin dilaurate, stannous octoate, and like, as well as potassium octoate. Commercially avaiable catalysts from Air Products under the tradenames Metacure and Polycat 46 can be used. These include Metacure K-15 (potassium octoate), Metacure T-95, T-96, T-10, T-16 (stannous octoate), and Metacure T-12 (dibutyl tin dilaurate). The amount of catalyst that is used is typically up to about 0.5% by weight based on the weight of the acrylate monomer or oligomer and the isocyante, and in one embodiment about 0.001 to about 0.1% by weight, and in one embodiment about 0.005 to about 0.05% by weight. The reaction temperature is generally from about 20° C. to about 120° C. These monomers or oligomers typically have molecular weights in the range of about 300 to about 2500, and in one embodiment about 300 to about 700.

Mixtures of the foregoing multifunctional meth(acrylate) monomers or oligomers and the foregoing urethane-containing multifuctional (meth)acrylate monomers or oligomers can be used.

In one embodiment, the inventive coating composition is characterized by the absence of fluorine-containing acrylate or methacrylate monomers or oligomers.

The inventive coating compositions typically contain from about 5% to about 99.9% percent by weight of the multifunctional (meth)acrylate monomer or oligomer, and in one embodiment from about 90% to about 99% by weight of such monomer or oligomer for clear coatings, and in one embodiment about 25% to about 90% by weight of such monomer or oligomer for pigmented coatings.

The azo initiator can be any azo compound known in the art for initiation of (meth)acrylate polymerizations. These include 2,2'-azobis(2,4-dimethylpentanenitrile), 2,2'-azobis (2-methylpropanenitrile), 2-2'-azobis(2-methylbutanenitrile), and 1,1'-azobis (cyclohexanecarbonitrile). The foregoing azo compounds are commercially available from DuPont under the trade designations Vazo 52, Vazo 64, Vazo 67 and Vazo 88, respectively. Additional azo compounds that are useful include 2,2'-azobis(4-methoxyl-2,4-dimethylvaleronitrile), dimethyl 2,2'-azobis-isobutyrate, and the like. Mixtures of two or more of the foregoing azo compounds can be used.

The coating compositions typically contain from about 0.1 to about 10 parts by weight of the azo initiator per 100 parts by weight of the multifunctional (meth)acrylate monomer or oligomer, and in one embodiment about 0.1 to about 5 parts by weight of the azo initiator per 100 parts by weight of the multifunctional (meth)acrylate monomer or oligomer, and in one embodiment about 0.1 to about 2 parts by weight of the azo initiator per 100 parts by weight of the multifunctional (meth)acrylate monomer or oligomer.

The inventive coating compositions contain dissolved oxygen gas typically at concentrations of about 0.00001 to about 0.5% by weight based on the total weight of the coating composition, and in one embodiment about 0.0001 to about 0.5% by weight, and in one embodiment about 0.0005 to about 0.1% by weight, and in one embodiment about 0.001 to about 0.05% by weight. In one embodiment, the oxygen that is contained in the inventive coating composition is contaminate atmospheric oxygen. An advantage of the present invention is that high grade coatings can be prepared with the inventive coating compositions even when contaminate atmospheric oxygen is present in such coating compositions.

In one embodiment, the inventive coating composition is a one-package coating composition. The term "one-package" is used herein to refer to a coating composition wherein all of the ingredients of the coating composition are combined in one storage stable mixture. Upon application the (meth)acrylate monomer or oligomer is cured under thermal cure conditions. This is distinguishable from a "two-package" system wherein the ingredients are present in two separate packages and combined at the time of application or up to about 8 hours prior to the time of application.

In one embodiment, the inventive coating compositions are characterized by a VOC content of less than about 1 pound of VOC per gallon of coating composition, and in one embodiment less than about 0.7 pound of VOC per gallon, and in one embodiment less than about 0.5 pound of VOC per gallon, and in one embodiment less than about 0.3 pound of VOC per gallon, and in one embodiment less than about 0.2 pound of VOC per gallon, and in one embodiment less than about 0.1 5 pound of VOC per gallon and in one embodiment less than about 0.1 pound of VOC per gallon, and in one embodiment less than about 0.05 pound per gallon, and in one embodiment less than about 0.01 pound per gallon, and in one embodiment less than about 0.001 pound per gallon. In one embodiment, the inventive coating composition is characterized by the absence of any VOC. The term "VOC" means volatile organic compound. "Volatile organic compounds" are defined by the U.S. Environmental Protection Agency (EPA) as organic compounds which participate in atmospheric photochemical reactions, except for specific designated compounds. The compounds identified by the EPA as VOCs are described at 40 CFR 51.100, which is incorporated herein by reference for its disclosure of VOCs.

Depending upon the field of application, the inventive coating compositions may also contain a variety of other additives common to the paint industry such as solvents, pigments, light stabilizers, rheology agents (e.g., thixotropic agents), mar or slip additives, adhesion promoters, wetting or dispersing agents, flow control agents, driers, monofuctional (meth)acrylate monomers or oligomers, and mixtures of two or more of the foregoing.

The solvents that can be used include water, glycol ethers, ketones (e.g., acetone), acetates (e.g., methyl acetate), aliphatic or aromatic hydrocarbons, halogenated hydrocarbons, alcohols, and the like. The solvents are preferably VOC exempt solvents. The solvent content of the inventive coating composition can range up to about 1 5% by weight, and in one embodiment up to about 5% by weight. An example of a commercially available VOC exempt solvent that is useful is supplied by Occidental Petroleum under the trade designation Oxsol 100 which is identified as parachlorobenzotrifluoride.

In one embodiment, the inventive coating compositions are solventless, that is, they contain no solvent.

The pigments that are useful can be inorganic or organic. These include titanium dioxide, carbon black, phthalocyanine blue or green, iron oxides, quinacridone red, and the like. The concentration of pigment in the inventive coating composition can range up to about 75% by weight, and in one embodiment about 1% to about 65% by weight, and in one embodiment from about 5% to about 60% by weight, and in one embodiment about 10% to about 45% by weight. Examples of commercially available pigments that can be used include TiONA RCL-535 (a product of Millenium identified as titanium dioxide), Hostaperm E3B (a product of Clariant identified as quinacridone red), and Monarch 1300 (a product of Cabot identified as carbon black).

The light stabilizers that are useful include hindered amines, aryl salicylates, benzophenones, benzotriazoles, triazines, salacylicacid esters, oxalanilides, formamidines, cyano-acrylates, benzyldenmalonates, and the like. The concentration of light stabilizer in the inventive coating composition can range up to about 10% by weight, and in one embodiment from about 0.1% to about 10% by weight, and in one embodiment about 0.1% to about 5% by weight, and in one embodiment about 0.5% to about 2% by weight. Examples of commercially available light stabilizers that can be used include those available from Ciba-Geigy under the trade designation Tinuvin. These include Tinuvin 1 23 (bis-(1-octyloxy-2,2,6,6,tetramethyl-4-piperidinyl) sebacate) and Tinuvin 292 (bis (1,2,2,6,6-pentamethyl-4-piperidinl)sebacate).

The rheology agents that are useful include organo clays, hydrogentated caster oils, overbased sulfonate gels, silica gels, and the like. The concentration of rheology agent in the inventive coating composition can range up to about 10% by weight, and in one embodiment from about 0.1% to about 10% by weight, and in one embodiment about 0.1% to about 5% by weight, and in one embodiment about 0.5% to about 3% by weight. Examples of commercially available rheology agents that can be used include Ircogel 905 (a product of Lubrizol identified as a gelled sulfonate), Bentone SD-2 (a product of Rheox Inc. identified as a treated clay), and Aerosil R972 (a product of Degussa Corp. identified as fumed silica).

The mar or slip additives that are useful include dispersed and micronized waxes, silicones, polyesters, fluoro surfactants, and the like. The concentration of mar or slip additive in the inventive coating composition can range up to about 5% by weight, and in one embodiment from about 0.05% to about 5% by weight, and in one embodiment about 0.05% to about 3% by weight, and in one embodiment about 0.1% to about 2% by weight. Examples of commercially available mar or slip additives that can be used include Lanco Wax 1780 (a product of Lubrizol identified as a polytetrafluoroethylene/polyethylene wax), BYK 307 (a product of BYK Chemie identified as an organically modified polysiloxane), and EFKA 3232 (a product of EFKA Chemicals identified as an organically modified polysiloxane).

The adhesion promoters that are useful include phosphate esters, silanes, acrylic acid, methacrylic acid, metal salts of acrylic or methacrylic acid (e.g., zinc diacrylate), vinyl phosphonic acid, vinyl sulfonic acid, 2-acrylamido-2-methyl propane sulfonic acid (AMPS), carboxlic acid functional (meth)acrylates, (meth)acrylate functional urethane monomers and oligomers, and the like. The concentration of adhesion promoter in the inventive coating composition can range up to about 10% by weight, and in one embodiment about 0.01% to about 10% by weight, and in one embodiment from about 0.01% to about 5% by weight, and in one embodiment about 0.05% to about 3% by weight, and in one embodiment about 0.1% to about 2% by weight. Examples of commercially available adhesion promoters that can be used include Lubrizol 2062 (a product of Lubrizol identified as a phosphate ester) and Silquest Silanes (a product of Osi Specialties identified as a silane).

The wetting or dispersing agents that are useful include fatty acid salts, multifunctional urethanes, polyalkyl ethers, and the like. The concentration of wetting or dispersing agent in the inventive coating composition can range up to about 90% by weight based on the weight of the pigment, if any, in the coating composition, and in one embodiment from about 0.5% to about 90% by weight, and in one embodiment about 0.5% to about 30% by weight, and in one embodiment about 1% to about 15% by weight. Examples of commercially available wetting or dispersing agents that can be used include those available from BYK Chemie under the trade designation Disperbyk. These include Disperbyk-110 (solution of a copolymer with acidic groups); Disperbyk-111 (copolymer with acidic groups); Disperbyk-115 (solution of a high molecular weight block copolymer with pigment affinic groups); Disperbyk-130 (solution of polyamine amides of unsaturated polycarboxylic acids); and BYK-220S (solution of a lower molecular weight unsaturate acidic polycarboxylic acid polyester with a polysiloxane copolymer). Also included are the Disperbyk-116, Disperbyk-160, Disperbyk-161, Disperbyk-162, Disperbyk-163, Disperbyk-164, Disperbyk-166 and Disperbyk-170.

The flow control agents that are useful include acrylic resins, silicones, fluorcarbons, and the like. The concentration of flow control agent in the inventive coating composition can range up to about 5% by weight, and in one embodiment from about 0.01% to about 5% by weight, and in one embodiment about 0.01% to about 3% by weight, and in one embodiment about 0.05% to about 1% by weight. Examples of commercially available flow control agents that can be used include BYK 300 (a product of BYK Chemie identified as a polysiloxane), EFKA 3277 (a product of EFKA Chemicals identfied as a fluorocarbon modified polymer), Lanco Flow U (a produt of Lubrizol identified as an acrylic polymer, and Fluorad FC 431, FC 143 and FC 26 (products of Minnesota Mining and Manufacturing Company (3M) identified as fluorocarbons).

The driers that are useful include any of the metallic compositions normally used for drying oil, paint, varnish, and the like. These are sometimes referred to as siccatives.

The metal compositions that are useful include the carboxylates of Co, Zr, La, Mn, Ca, Zn, Fe, Al and Sn. These compositions are commercially available in the form of solutions (in solvents or in excess acid), solventless liquids or solids (powder or postille form). A commercially available drier that can be used is Polcure 503, which is a product of OMG identified as a metal carboxylate. These driers can be used in the inventive coating compositions at concentrations of up to about 2% by weight, and in one embodiment about 0.01 to about 0.5% by weight.

The monofuctional (meth)acrylate monomers or oligomers can be used at a concentration of up to about 20% by weight, and in one embodiment about 0.1% to about 20% by weight.

The viscosity of the inventive coating composition can be any viscosity that is suitable for applying the coating composition to a substrate using known application techniques. In one embodiment, the viscosity at 20° C. is in the range of about 10 to about 2000 centipoise, and in one embodiment about 10 to about 1000 centipoise, and in one embodiment about 10 to about 500 centipoise, and in one embodiment about 40 to about 350 centipoise.

The inventive coating compositions can be applied as coatings to a substrate by any of the conventional coating techniques such as brushing, spraying, dipping, roll coating or flowing. Spray applications are particularly advantageous. Any of the known spray techniques may be employed such as compressed air spraying, airless spraying, electrostatic spraying and either manual or automatic methods.

After application of the inventive coating composition to the substrate, the coated substrate is heated to cure the coating. In the curing operation, solvents (if present) are driven off and the multifunctional (meth)acrylates are cross linked. Cross linking is initiated by the azo initiator. An advantage of this invention is that the applying and heating or curing steps are conducted in the presence of oxygen (e.g., oxygen containing gases such as air). The heating or curing operation is usually carried out at a temperature of at least about 150° F. (65.6° C.). In one embodiment, the heating or curing operation is carried out at a temperature of about 275° F. (135° C.) to about 350° F. (177° C.) for about 10 to about 30 minutes. In one embodiment, it is carried out at a temperature of about 400° F. (204° C.) to about 500° F. (260° C.) for about 45 seconds to about 2 minutes. The coatings as applied are in the form of thin films. The heating can be effected using any conventional cure oven. Alternatively, heating can be effected using infrared, microwave or radio frequency radiation. The dry film thickness of the inventive coatings is typically about 0.01 to about 5 mils, and in one embodiment about 0.1 to about 2.5 mils. Any substrate suitable for coating with a coating composition can be coated using the inventive coating process. The substrate can be made of metal, wood, plastic, and the like. These substrates include metal cans, metal sheet, metal plate, metal parts, automotive bodies, automotive body parts, and the like.

EXAMPLES

The coatings exemplified below are subjected to a number of test procedures. These are as follows.

Brookfield Viscosity:

The Brookfield viscosity in centipoise (cps) is measured with a Brookfield Viscometer Model LVF with Spindle 2 at 60 revolutions per minute at the indicated temperature.

Gloss:

The gloss of the cured coatings is determined at two angles of incidence of light, namely 60° and 20°, as provided for in ASTM D523-80.

Distinctness of Image (DOI):

The DOI is a measure of the quality of a reflected image on a surface. The DOI of the cured coatings is measured by visual comparison of known standards to experimental coatings.

Pencil Hardness:

Pencil leads of increasing hardness values are forced against the film coating surface in a defined manner as described in ASTM-D-3363 until one pencil lead cuts the surface of the film coating. The surface hardness is considered as the hardest pencil grade which failed to cut the film coating surface. The pencil leads in order of softest to hardest are as follows: 6B, 5B, 4B, 3B, 2B, B, HB, F, H, 2H, 3H, 4H, 5H, 6H, 7H, 8H, and 9H.

Non-Volatile Content:

Non-volatile content is a measure of the weight of a coating material not evaporated under specified heating conditions. It is determined using the procedure described in ASTM D 3960.

MEK Double Rubs:

MEK (methyl ethyl ketone) double rubs are used to measure the extent to which a coating has cured. The procedure involves rubbing the surface of a coating using an MEK saturated cotton cloth with a back and forth motion over a test area of two inches for the indicated number of rubs.

Radius Bend:

Radius bend is a measure of film flexibility. The procedure is described in ASTM D 4145.

Cross hatch adhesion is a measure of the adhesion of a film to a substrate. The procedure is described in ASTM D3359.

Reverse Impact:

Reverse impact is used to measure film flexibility and adhesion. The procedure involves dropping a one-pound conical weight on the reverse side of a coated metal panel from a given height measured in inches. Reverse impact values are reported in inch-pounds.

Example 1

Part A

The following materials are mixed with stirring at 40° C. for 24 hours to form an acrylate functional urethane prepolymer:

|  | Wt. (grams) |
| --- | --- |
| SR 495 | 122.270 |
| Desmodur I | 39.506 |
| Dabco T-12 | 0.016 |

SR 495 is a product of Sartomer Company identified as caprolactone acrylate. Desmodur I is a product of Bayer identified as isophorone diisocyanate. Dabco T-12 is a product of Air Products identified as an organo tin catalyst.

Part B

The following ingredients are mixed at a temperature of 25° C., stripped using a vacuum (less than or equal to 5 mmHg absolute), and then filtered to provide the desired coating composition.

| | Wt. (grams) |
|---|---|
| Product from Part A | 40.00 |
| SR-492 | 160.00 |
| Vazo 88 | 2.00 |
| Byk 331 | 0.40 |
| Polycure 503 | 0.04 |

The non-volatile content of the resulting coating composition is 98.9% by weight. The viscosity at 22° C. is 193 centipoise. The coating composition is spayed from an HVLP (high volume low pressure) spray gun onto a cured Ford OEM automotive topcoat and cured at 270° F. (132.2° C.) for 30 minutes. The resulting coating has a thickness of 2 mils. The coating exhibits a pencil hardness of 3H, high gloss (20° gloss =81.5, 60° gloss =88.5), excellent DOI, and excellent flexibility (panel is bent around a 5T (5 times the thickness of the panel) radius at greater than 90° without damage to the coating).

Example 2

The following ingredients are blended together at room temperature in a stainless steel dispersion cup:

| | Wt. (grams) |
|---|---|
| Caprolated Trimethylolpropane trimethacrylate | 30.13 |
| Disperbyk 111 | 4.75 |
| Disperbyk 116 | 15.77 |
| Hydroquinone | 0.0034 |

TiONA RCL-535 (157.2 grams) is added to the mixture using a spatula. The mixture is mixed using a high speed disperser (10,000–25,000 rpm) for 13 minutes. The temperature of the mixture increases to 40–50° C. The resulting mixture is a pigment dispersion having a pigment to binder ratio of 4:1.

The following ingredients are added to the foregoing pigment dispersion with stirring:

| | Wt. (grams) |
|---|---|
| SR-492 | 68.00 |
| SR-501 | 67.82 |
| BYK-307 | 0.349 |

The mixture is stripped under vacuum (less than or equal to 5 mm Hg absolute) for two hours at a temperature of 40–60° C. while bubbling dry air through the mixture. Vazo 64 (2.00 grams) is added to the mixture at atmospheric pressure. The mixture is stirred for 30 minutes at a temperature of 30–35° C. and then filtered through a 30 micron filter. The resulting coating composition has the following characteristics:

| | |
|---|---|
| Pigment to binder ratio: | 0.9:1 |
| Non-volatile Content: | 98.3% |
| Viscosity @ 25° C.: | 165 cps |

The coating composition is sprayed on to ground and treated Bonderite 1000 steel panels. (Bonderite 1000 steel panels are available from Q Panel Lab Products. They have a machined surface treated with iron phosphate.) The dry film thickness is 1.5–1.9 mils. The coating is sprayed using an HVLP touch-up gun at pressure of 45 psi and baked for 15 minutes at 300° F. (149° C.). The coating exhibits good hiding and has the following characteristics:

| | |
|---|---|
| Pencil hardness: | 3H |
| Cross hatch adhesion | 5B |
| 100 MEK double rubs: | Passed |
| 180° 0.5 inch radius bend: | Passed |
| 60° Gloss: | 118% |
| DOI: | High |

After one hour exposure to boiling water, the cross-hatch adhesion recovery is 4B after 5 minutes, and 5B after 30 minutes.

Example 3

Part A

The following ingredients are added to a 500 ml flask equipped with a dry air inlet and a magnetic stir bar. The mixture is stirred at room temperature with dry air bubbling through the mixture for 30 minutes, heated to 60° C. over a period of 30 minutes and held at 60° C. for an additional 60 minutes to provide the desired product.

| | Wt. (grams) |
|---|---|
| SR 495 | 303.36 |
| Desmodur I | 100.00 |
| Dabco T-12 | 0.0330 |

Part B

The following ingredients are mixed at a temperature of 25° C., stripped using a vacuum (less than or equal to 5 mmHg absolute), and then filtered to provide the desired coating composition.

| | Wt. (grams) |
|---|---|
| Product from Part A | 28.48 |
| SR 492 | 113.93 |
| SR 501 | 34.56 |
| Vazo 64 | 2.21 |
| BYK 331 | 0.346 |
| Vinylphosphonic acid | 0.182 |

The coating composition has the following properties:

| | |
|---|---|
| Non-Volatile Content: | 99.2% |
| Viscosity @ 24° C.: | 145 cps |

Part of the coating composition is sprayed on to bare steel panels at a dry film thickness of 1.0–1.2 mils using an HVLP touch-up gun at a pressure of 45 psi and baked for 20 minutes at 300° F. (149° C.). The coating has the following characteristics:

| Pencil hardness: | 3H |
|---|---|
| Cross hatch adhesion (ASTM D3359): | 5B |
| 100 MEK double rubs: | Passed |
| 180° 3T radius bend (three times the thickness of the substrate): | Passed |
| DOI: | High |

After one hour exposure to boiling water, the cross-hatch adhesion recovery is 5B after 5 minutes, and 5B after 30 minutes.

The remaining part of the coating composition is sprayed on to bare aluminum panels at a dry film thickness of 0.4–0.7 mil using an HVLP touch-up gun at pressure of 45 psi and baked for 20 minutes at 300° F. (149° C.). The coating has the following characteristics:

| Pencil hardness: | 3H |
|---|---|
| Cross hatch adhesion: | 5B |
| 100 MEK double rubs: | Passed |
| 180° 0.25 inch radius bend: | Passed |
| DOI: | High |

After one hour exposure to boiling water, the cross-hatch adhesion recovery is 5B after 5 minutes, and 5B after 30 minutes.

Example 4

The following ingredients are mixed at atmospheric pressure and a temperature of 25° C., stripped a under vacuum (less than or equal 5 mmHg absolute), and then filtered to provide the desired coating composition.

|  | Wt. (grams) |
|---|---|
| SR 492 | 5.538 |
| SR 501 | 10.42 |
| Vazo 64 | 0.1529 |
| BYK 307 | 0.0184 |
| Acrylic acid | 0.1644 |
| Vinylphosphonic acid | 0.0274 |

The coating composition has the following properties:

| Non-Volatile Content: | 99.0% |
|---|---|
| Viscosity @ 24° C.: | 90 cps |

The coating composition is sprayed on to bare steel panels at a dry film thickness of 0.9–1.1 mils using an HVLP touch-up gun at a pressure of 45 psi and baked for 20 minutes at 300° F. (149° C.). The coating has the following characteristics:

| Pencil hardness: | 3H |
|---|---|
| Cross hatch adhesion: | 5B |
| 100 MEK double rubs: | Passed |
| 180° 0.25 inch radius bend: | Passed |
| DOI: | High |

Example 5

The following ingredients are added to a 0.5 pint stainless steel beaker and ground to a Hegman of 7.5 using a Premier Mill with Cowles blade at 3000 rpm for 10 minutes:

|  | Wt. (grams) |
|---|---|
| Caprolated trimethylolpropane trimethacrylate | 30.13 |
| Disperbyk 111 | 4.75 |
| Disperbyk 161 | 15.77 |
| Hydroquinone | 0.034 |
| TiONA RCL-535 | 157.20 |

The foregoing composition is the letdown into a premix of the following ingredients in a pint paint can, and the total mix stirred at 500 rpm for 10 min.:

|  | Wt. (grams) |
|---|---|
| SR-492 | 68.00 |
| SR-501 | 67.82 |
| Byk 307 | 0.349 |
| VAZO 67 | 2.00 |

Without further workup, the resulting coating has the following characteristics:

| Pigment to binder ratio: | 0.9:1 |
|---|---|
| Non-volatile content: | 96.4% |
| Viscosity @ 25° C. (Brookfield, 20 rpm) | 180 cps. |

The coating is drawn on a Bonderite 1 000 panel using a No. 20 wire wound drawdown bar, and baked for 15 minutes at 150° C. The dry film thickness is 1.2–1.3 mils and the film has the following characteristics:

| Pencil Hardness | 2H |
|---|---|
| Cross Hatch Adhesion | 5B |
| Reverse Impact | 60 inch pounds |
| 60 Degree Gloss | 93 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for coating a substrate comprising the steps of:

applying a thin film of a coating composition to said substrate; said coating composition comprising a monomer or oligomer containing two or more acrylate and/or methacrylate functional groups, an azo initiator and oxygen, said coating composition having a VOC content of less than about one pound of VOC per gallon of said coating composition; and heating said coating composition at an effective temperature for an effective period of time to cure said coating composition, said applying and heating steps being conducted in the presence of oxygen.

2. The process of claim 1 wherein said composition has a VOC content of less than about 0.7 pound of VOC per gallon of said composition.

3. The process of claim 1 wherein said composition is a one-package coating composition.

4. The process of claim 1 wherein said composition has a viscosity at 20° C. in the range of about 10 to about 2000 centipoise.

5. The process of claim 1 wherein said monomer or oligomer further comprises at least one functional group attached to it, said functional group being selected from the group consisting of epoxy, hydroxy, carboxy, sulfonic, phosphonic, isocyanate, vinyl, allyl, halide, amine, sulfonamide, carbamide, carbodiimide, cyano, acetylenic, aldehyde, peroxy, hydroperoxy, azo, peroxyester, and combinations of two or more of the foregoing.

6. The process of claim 1 wherein said monomer or oligomer is a compound represented by the formula

(I)

wherein in formula (I):
R is a hydrocarbon group, a siloxane group, a partially fluorinated hydrocarbon group or a perfluorocarbon group;
each A is independently a divalent group derived from an epoxide, a mixture of diol and dicarboxylic acid, a lactone, a lactam, an amino acid, a hydroxy acid or lactide;
each B is independently hydrogen, a hydrocarbon group, a perfluorinated hydrocarbon group, or a group represented by the formula

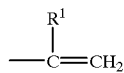

(II)

wherein in formula (II) $R^1$ is hydrogen, a hydrocarbon group, a siloxane group, a partially fluorinated hydrocarbon group or a perfluorocarbon group;
x is a number in the range from zero to about 50; and
y is a number in the range from 2 to about 10.

7. The process of claim 1 wherein said monomer or oligomer is a compound selected from the group consisting of triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol dimethacrylate, tetraethylene glycol diacrylate, triethylene glycol diacrylate, 1,3-butylene glycol dimethacrylate, tripropylene glycol diacrylate, polyethylene glycol diacrylate, cyclohexane dimethanol dimethacrylate, cyclohexane dimethanol diacrylate, ethoxylated bisphenol A diacrylate, ethoxylated bisphenol A dimethacrylate, propoxylated neopentyl glycol diacrylate, alkoxylated aliphatic diacrylate, trimethylolpropane trimethacrylate, trimethylolpropane triacylate, tris (2-hydroxy ethyl) isocyanurate triacrylate, ethoxylated trimethylolpropane triacrylate, pentaerythritol triacrylate, propoxylated trimethylolpropane triacrylate, propoxylated glyceryl triacrylate, pentaerythritol tetraacrylate, di-trimethylolpropane tetraacrylate, dipentaerythritol pentaacrylate, ethoxylated pentaerythritol tetraacrylate, pentaacrylate ester, and mixtures of two or more thereof.

8. The process of claim 1 wherein said monomer or oligomer is a propoxylated trimethylolpropane tri(meth)acrylate.

9. The process of claim 1 wherein said monomer or oligomer is a urethane containing multifunctional (meth)acrylate monomer or oligomer.

10. The process of claim 1 wherein said monomer or oligomer has a molecular weight in the range of about 200 to about 5000.

11. The process of claim 1 wherein said azo initiator is a compound selected from the group consisting of 2,2'-azobis(2,4-dimethylpentanenitrile), 2,2'-azobis(2-methylpropanenitrile), 2-2'-azobis(2-methylbutanenitrile), 1,1'-azobis(cyclohexanecarbonitrile), 2,2'-azobis(4-methoxy-2,4-dimethylvaleronitrile), dimethyl-2,2'-azobisisobutyrate, and mixture of two or more thereof.

12. The process of claim 1 wherein said monomer or oligomer is present in said composition at a concentration in the range of about 5% to about 99.9% by weight.

13. The composition of claim 1 wherein said composition comprises is about 0.1 to about 10 parts by weight of azo initiator per 100 parts by weight of said monomer or oligomer.

14. The process of claim 1 wherein said composition further comprises a solvent, pigment, light stabilizer, rheology agent, mar or slip additive, adhesion promoter, wetting or dispersing agent, flow control agent, drier, monofunctional (meth)acrylate monomer or oligomer, or a mixture of two or more thereof.

15. The composition of claim 1 wherein said composition is solvent free.

16. The process of claim 1 wherein said applying step comprises spraying said coating composition.

17. The process of claim 1 wherein said substrate is a metal can, metal sheet, metal plate, metal part, automotive body or automotive body part.

18. The process of claim 1 wherein said heating step is conducted at a temperature of at least about 150° F. (65° C.).

19. The process of claim 1 wherein said applying and heating steps are conducted in the presence of air.

20. The process of claim 1 wherein said heating is effected using infrared, microwave or radio frequency radiation.

* * * * *